United States Patent [19]
Robertson

[11] Patent Number: 5,655,465
[45] Date of Patent: Aug. 12, 1997

[54] TREATMENT OF TOXIC WASTES

[75] Inventor: Struan Glen Robertson, Paradise Waters, Australia

[73] Assignees: Tox Free Systems, Inc.; Tox Free Limited, both of Australia

[21] Appl. No.: 454,391

[22] PCT Filed: Dec. 14, 1993

[86] PCT No.: PCT/AU93/00646

§ 371 Date: Jul. 27, 1995

§ 102(e) Date: Jul. 27, 1995

[87] PCT Pub. No.: WO94/15150

PCT Pub. Date: Jul. 7, 1994

[30] Foreign Application Priority Data

Dec. 18, 1992 [AU] Australia ............... PL6445

[51] Int. Cl.⁶ .................................. F23G 5/00
[52] U.S. Cl. ............ 110/346; 110/236; 110/257; 110/258; 110/229
[58] Field of Search ............ 110/204, 205, 110/227–229, 236, 257, 258, 346

[56] References Cited

U.S. PATENT DOCUMENTS

| | | | |
|---|---|---|---|
| 4,821,653 | 4/1989 | Jones | 110/229 |
| 5,072,674 | 12/1991 | Noland et al. | 110/229 X |
| 5,117,771 | 6/1992 | Summers | 110/229 X |
| 5,220,873 | 6/1993 | Milsap, III | 110/229 X |
| 5,337,684 | 8/1994 | Summers | 110/229 X |
| 5,405,579 | 4/1995 | Melzer et al. | 110/236 X |

FOREIGN PATENT DOCUMENTS

| | | |
|---|---|---|
| 2814156 | 9/1988 | European Pat. Off. . |
| 55-35821 | 3/1980 | Japan . |
| 8904730 | 6/1989 | WIPO . |

*Primary Examiner*—Henry A. Bennett
*Assistant Examiner*—Susanne C. Tinker
*Attorney, Agent, or Firm*—VanOphem Meehan & VanOphem, P.C.

[57] ABSTRACT

Toxic wastes and other contaminants are removed from soil which is fed through a passage in an agitating means into a retort (10, 110) where the soil is agitated and brought into contact with the retort walls (11, 111, 111A) (at a temperature preferably above 500° C.) to cause the toxic wastes or contaminates to be desorbed. The "off-gases" from the soil may be mixed with air/fuel in a combustion chamber (31, 131), to heat the retort; may be burnt in a secondary burner (40) to preheat and/or dry the soil feed; or be condensed in a condenser (41) and stored.

12 Claims, 3 Drawing Sheets

TREATMENT OF TOXIC WASTES

BACKGROUND OF THE INVENTION

1. Field of the Invention

This invention relates to the treatment of toxic wastes. The invention is particular by suitable for, but not limited to, the thermal desorption of hydrocarbon contaminants from soils.

The contaminants may include, but are not limited to, petroleum products (e.g. petrol, oils, greases); phenols; coal tars; cyanides; pesticides; PCB's and HCB's.

2. Prior Art

The treatment of contaminated soils is a world-wide problem. Often the soils are simply removed and transferred to a toxic waste dump. This does no more than move the problem.

Where thermal treatment of the wastes is effected, the traditional method is by direct heating in a rotary kiln. Indirect treatment methods include (a) the externally heated rotary kilns (where the heat is transferred through the kiln wall to the soil) and (b) auger-type heaters, where heat is applied to the soil through the heater casing and/or the flyte(s), of the auger e.g. by the circulation of hot oil. With such methods, the soil may only be heated to approximately 150°–450° C. and many contaminants may not be treated at those relatively low temperatures.

For contaminants such as PCB's, the Environmental Protection Authorities around the world specify strict conditions for their disposal in very high temperature incinerators, e.g. found on the vessel "VULCANUS".

SUMMARY OF THE INVENTION

It is an object of the present invention to provide a method for the treatment of soils to remove hydrocarbon and other contaminants.

It is an object of the present invention to provide a method which meets, and exceeds, Environmental Protection Authorities specifications.

It is a further object of the present invention to provide a method which can be carried out on the site of the contamination.

It is still a further object of the present invention to provide an apparatus to effect the method of the present invention.

One aspect the present invention resides in a method of treating toxic wastes or other contaminants in soils, the method of one embodiment of the present invention including the steps of:

feeding the contaminated soil to a heated retort (optionally) operating at above 500° C.;

agitating the soil to come into contact with the walls of the retort to cause the waste or contaminants to be given off from the soil and gases; and discharging the soil from the retort.

Preferably the retort is heated by the external gases from a combustion cheer, where the combustion chamber may surround the retort.

The soil may be ground to a powder or granular form and may be preheated and/or dried before being fed to the retort.

Preferably a screw Conveyor or the like agitates the soil to generate rapid circulation of the soil in the retort for improved heat transfer from the walls of the retort and better mixing of the soil to ensure all of the soil is treated.

The gases may be transferred to the combustion chamber to be burnt with air and optionally fuel to generate the heat to heat the retort; may be burnt in a secondary burner to preheat the soil fixed or be condensed and stored for later destruction.

A second aspect the present invention resides in an apparatus for the treatment of toxic wastes, including hydrocarbon contaminants, including:

a heated retort;

means to feed contaminated Soil to the retort;

agitator means in the retort to agitate the soil and cause the soil to come into contact with the heated walls of the retort to cause the contaminants to be given off as gases;

discharge means from the retort for the treated soil;

combustion chamber means; and heat transfer means to transfer heat from the combustion chamber means to at least a portion of the retort to heat the retort.

The combustion chamber may at least partially surround the retort; or the retort may be at least partially surrounded by a heat chamber and the heat transfer means includes means to transfer the heat from the combustion chamber to the heating chamber to heat the retort.

Preferably the retort is substantially or wholly enclosed by the heating chamber, and has stainless or alloy steel walls capable of withstanding >1000° C., while allowing effective heat transfer from the heating chamber to the soil in the retort.

Preferably the soil is crushed or ground and is fed through a hollow shaft or tube of a rotatable helical spiral, the latter being rotated to agitate the soil in the retort. Alternatively, the soil is fed into the retort (e.g. by a screw conveyor) and is agitated by a vertical auger or spiral in the retort. Preferably, the helical flyte(s) of the spiral have a break or discontinuity intermediate their length, so that the soil will rise from the base of the retort, be circulated, settled, then rise, be circulated and discharged.

The discharge means in the retort may comprise a weir over which the treated soil falls into a discharge pipe and thereby to a cooler.

Preferably the retort has a conical- or dome-like roof which directs the "off gases" to a pipe which transfers the gases to the combustion chamber for combustion with air and gaseous fuel e.g. L.P.G., propane; to a secondary burner and/or heater to heat and/or pre-dry the soil feed; or to a condenser to condense the gases for storage.

The hot exhaust gases from the combustion chamber may be transferred to the heating chamber to heat the retort and then to a gas exhaust stack which may incorporate a gas scrubber or other suitable pollution control means.

BRIEF DESCRIPTION OF THE DRAWINGS

To enable the invention to be fully understood, preferred embodiments will now be described with reference to the accompanying drawings in which.

DETAILED DESCRIPTION OF THE PREFERRED EMBODIMENTS

Figure 1:
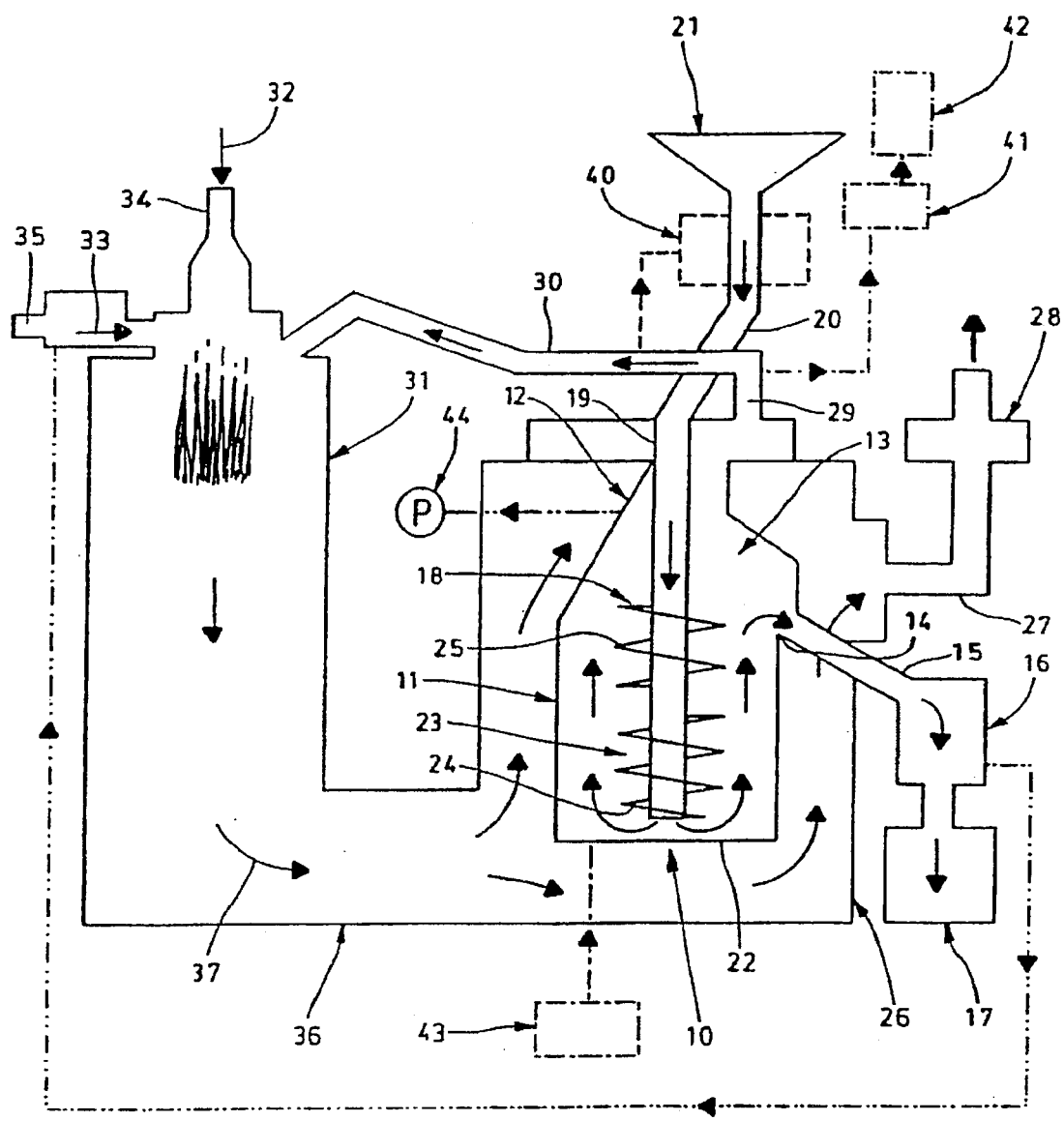
FIG. 1 shows a schematic view of a first embodiment of the apparatus.

Referring generally to the drawings and in particular to FIG. 1, a retort 10 has walls 11 of stainless- or alloy steel, for example capable of withstanding temperatures of >1000°

C. The retort is closed by a conical or dome-like roof 12. On one side, a discharge chamber 13 has a weir 14 over which a treated soil tumbles into a discharge pipe 15 to a cooler 16 and then to a storage unit 17.

A substantially vertical spiral 18, rotated by a motor (not shown), has a tubular body 19 connected at its upper end to a soil feed pipe 20 connected to a supply 21 of contaminated soil, which may be in powder/fine granule form from a crusher (not shown). The lower end of the tubular body 19 terminates just above the floor 22 of the retort 10. A helical flyte 23 about the tubular body is separated into a lower spiral 24 and an upper spiral 25.

The retort 10 is surrounded by a heating chamber 26, lined with refractory material, and has a gas exhaust stack 27 which incorporates a gas scrubber 28 (or other pollution control equipment).

A gas passage 29 connects he upper portion of the retort 10 to an "off gas" pipe 30 connected to a flame zone of a combustion chamber 31. LPG (or other fuel) 32 and air 33 are supplied to the combustion chamber 31 via suitable inlets 34, and 35, respectively, and a passage 36 transfers the hot exhaust gases 37 from the combustion chamber 31 to the heating chamber 26.

The apparatus may be mounted on a vehicle or suitable transport frame (not shown) to enable it to be transported so that the contaminated soil is treated on-site.

The operation of the apparatus will now be described.

Contaminated soil, e.g. soil contaminated with pesticides or PCB's, is crushed in he crusher and fed down the interior of the tubular body 19 of the spiral 18 into the retort 10.

The retort 10 is heated to a temperature of approximately 500°–1000° C. by the hot exhaust gases 37 in the heating chamber 26.

The soil rises up the retort 10 and is circulated by the lower spiral 24, the soil coming into contact with the hot retort wall 11. At the level of the break between the spirals 24 and 25, it partially settles (i.e. is less agitated) before being raised and circulated by the upper spiral 25. The contaminants are heated to the gaseous phase and are given off from the soil and due to the residence time of the soil in the retort, the contaminants may be at least partially destroyed, burnt or pyrolyzed.

The treated soil falls or tumbles over the weir 14 into the discharge pipe 15 to be cooled by the cooler 16 and then conveyed to the storage unit 17.

The hot "off gas" is directed by the dome-like roof 12 of the retort 10 into the gas passage 29 and thereby by "off gas" pipe 30 to be burnt in the combustion chamber 31. The gas may have a residence time of e.g. 1–10 seconds at a temperature of e.g. 700°–1400° C. which will ensure all the contaminates (e.g. PCB's ) are fully incinerated.

The hot exhaust gases from the combustion chamber 31 are directed to the heating chamber 26 to heat the retort 10, before being exhausted via the gas exhaust stack 27 and the gas scrubber 28.

It will be noted that the gases given off by the contaminants in the soil undergo a two-stage treatment process to ensure full removal and destruction of same.

The construction of the spiral 18, with its upper and lower spirals 24 and 25, respectively ensures efficient agitation of the soil in the retort and a long "residence" time of the soil particles in contact with the retort wall 11.

In a modified embodiment, the "off-gas" may be directed from the gas passage 29 to a secondary burner 40 which is used to preheat and/or dry the incoming soil feed before or as it passes along the soil feed pipe 20.

In an alternative embodiment, the "off-gas" is drawn from the gas passage 29 to a condenser 41, where it is cooled and placed in a contaminant storage unit 42, for later destruction.

The air 33 for the combustion chamber 31 may be pro-heated by a transfer of heat from the cooler 16 for the treated soil to the incoming air 33.

The desorption of the contaminants from the soil may be assisted/accelerated by the pumping of a stripping gas 43 into the retort 10, as well as by the application of a pressure or partial vacuum in the retort 10 by a pump 44.

Figure 2:
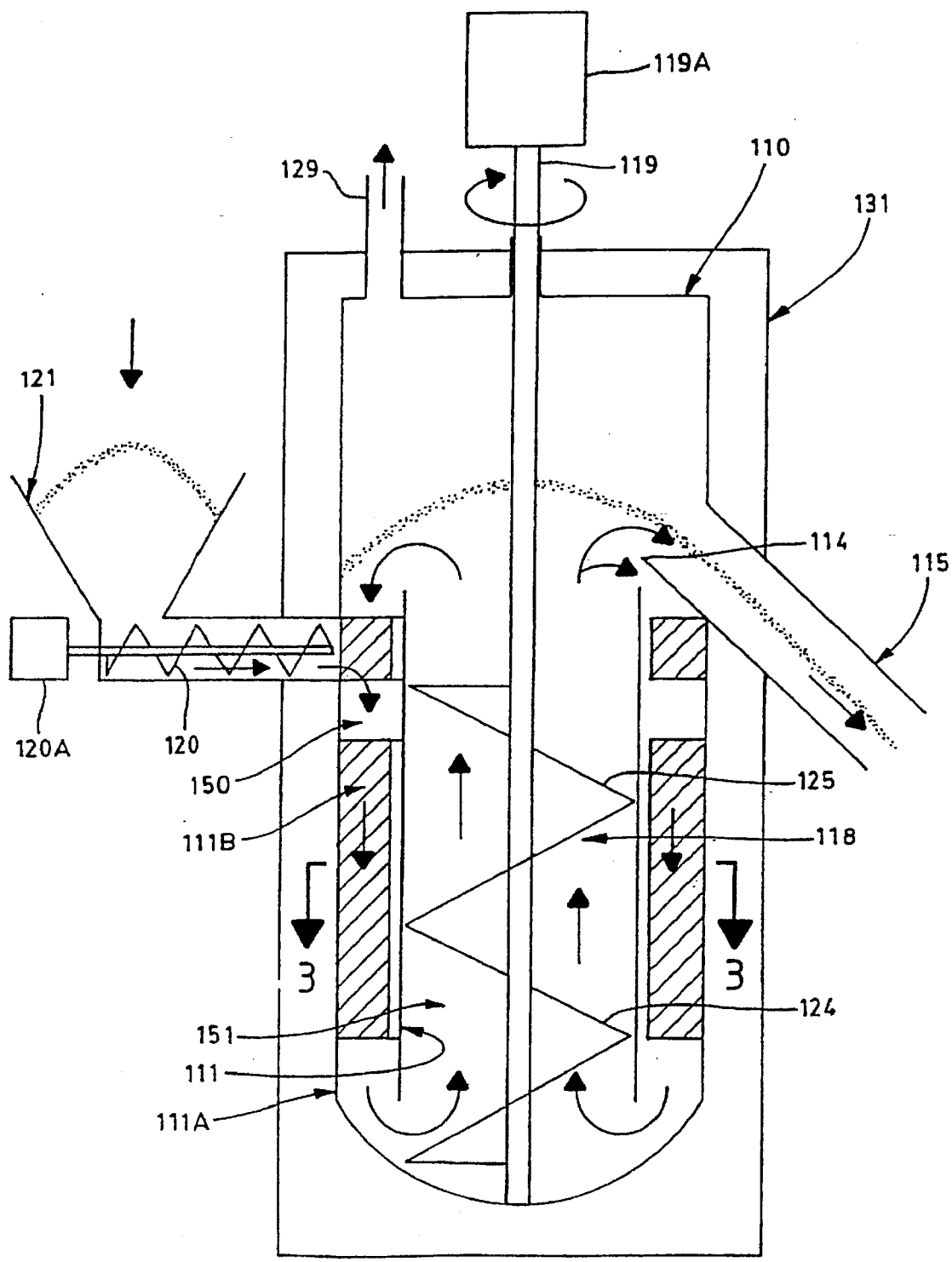
FIG. 2 is a schematic view of a retort of a second embodiment.
Figure 3:
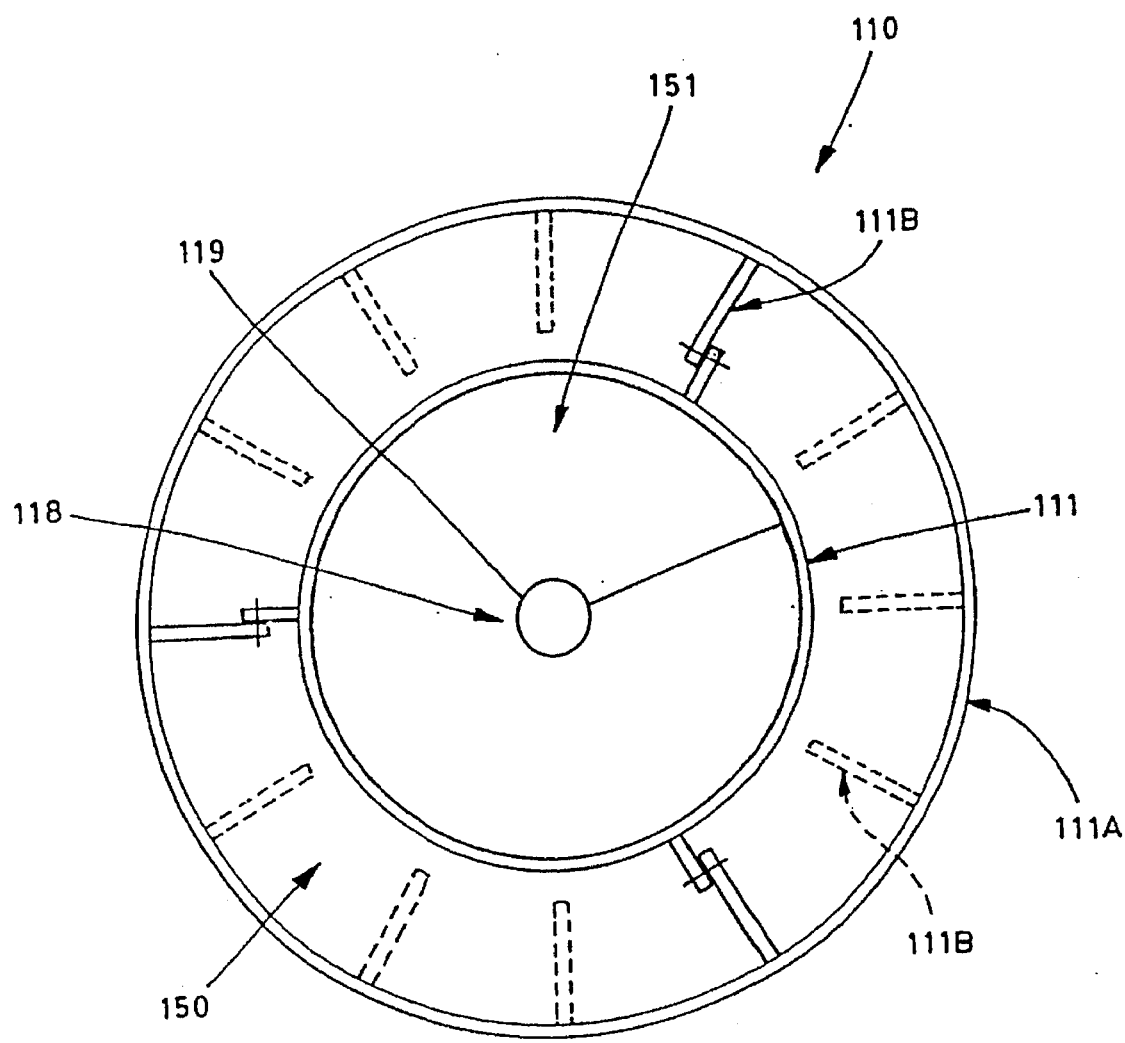
FIG. 3 is a sectional view taken on line 3—3 in FIG. 2.

Referring particularly now to FIGS. 2 and 3, a retort 110 is enclosed in a combustion chamber 131 for direct heat transfer to the retort 110.

The retort 110 is in the form of an annulus (see FIG. 3) with an inner retort wall 111 connected to an outer retort wall 111A by radially extending heat transfer fins 111B (which assist in transferring the heat to the soil).

Soil, from a supply 121 is transferred to the retort 110 by a screw conveyor 120 (with motor 120A) and passes down an annular chamber 150 defined by the inner and outer retort walls 111, 111A, the mixing of the soil being assisted by the heat transfer fins 111B.

A shaft 119 of a vertical spiral 118 is driven by a motor 119A and upper and lower helical flytes 125 and, 124 respectively, cause the soil to be agitated within an inner chamber 151 of the retort 110, defined by the inner retort wall 111.

A portion of the treated soil passes over a weir 114 and enters a discharge pipe 115 (to be cooled and stored as hereinbefore described). The balance of the soil is recycled to the annular chamber 150 and mixed with the incoming soil from the screw conveyor 120 for further treatment. The hot "off-gas" is drawn from the retort 110 via a gas passage 129 and can be supplied to the combustion chamber 131; to a secondary burner to preheat and dry the incoming soil; or to a condenser to be cooled and stored, as hereinbefore described.

The rapid circulation of the soil in the retort 10, 110 ensures efficient heat transfer from the retort walls 11, 111, 111A to the soil and better mixing of the soil to ensure all contaminants are desorbed from the soil.

For high boiling point (B.P.) contaminants the application of a partial vacuum to the retort 10, 110 by the pump 44 will lower the B.P.

In certain installations, all or part of the heating for the retort may be provided by electrical heating, obviating the need for a combustion chamber.

The residence time of the soil in the retort required to desorb the contaminants will depend, inter alia, on:

(1) the temperature of the retort;

(2) soil particle size;

(3) physical characteristics of the soil;.

(4) pressure in the retort; and (5) local treatment regulations.

It is possible to separate the contaminants (e.g. where different storage/handling is required for different toxicities) by treating the soil at e.g. 300° C. to remove one or more contaminants, and the re-treatment at e.g. 600° C. to remove the balance. Alternatively, two or more retorts may be provided in series to treat the soil in cascades, with the retorts operating at increasing temperatures along the series.

The embodiments described and illustrated are by way of examples only. Various changes and modifications may be made to the embodiments described and illustrated without departing from the scope of the present invention defined in the appended claims.

What is claimed is:

1. A method of treating toxic wastes or other contaminants in soils, the method including the steps of:

feeding the contaminated soil through a passage within an agitating means to a point at the bottom of a heated retort operating at above 500° C.;

agitating the soil to come into contact with the walls of the retort to cause the waste or contaminants to be given off from the soil as gases;

agitating the soil with a screw conveyor having a first flyte and a separate second flyte to generate rapid circulation of the soil in the retort for improved heat transfer from the walls of the retort and better mixing of the soil to ensure all of the soil is treated;

collecting the gases from the heated soil; and discharging the soil from the retort.

2. A method according to claim 1 wherein:

the retort is heated by the exhaust gases from a combustion chamber, where the combustion chamber surrounds the retort.

3. A method according to claim 1 wherein:

the soil is ground to a granular form; and is preheated and dried before being fed to the retort.

4. A method according to claim 1 further comprising the steps of:

transferring the gases from the soil to a combustion chamber to be burnt with air and fuel to generate heat for heating the retort; and preheating the contaminated soil prior to feeding the contaminated soil into the retort.

5. Apparatus for the treatment of toxic waste contaminated soil, the apparatus comprising:

a heated retort;

means for feeding the contaminated soil to the retort comprising a hollow shaft of a rotatable helical spiral through which the soil is fed to the retort, the helical spiral being rotated to agitate the soil in the retort;

agitator means located in the retort for agitating the soil and causing the soil to come into contact with the heated walls of the retort to cause the contaminants in the soil to be given off as gases, the agitator means comprising the rotatable helical spiral;

discharge means from the retort for the treated soil;

a combustion chamber connected to the retort for heating the retort; and heat transfer means for transferring heat from the combustion chamber to at least a portion of the retort to heat the retort.

6. Apparatus according to claim 5 further comprising:

a heating chamber at least partially surrounding the retort and receiving heat from the combustion chamber; and wherein the heat transfer means includes means to transfer the heat from the combustion chamber to the heating chamber to heat the retort.

7. Apparatus according to claim 6 wherein:

the retort is substantially or wholly enclosed by the heating chamber, and has stainless or alloy steel walls capable of withstanding temperatures greater than 1000° C., while allowing effective heat transfer of heat from the heating chamber to the soil in the retort.

8. Apparatus according to claim 5 wherein the helical spiral comprises a first helical flyte, a second helical flyte and a break intermediate the first and second helical flytes so that the soil will rise from the base of the retort, be circulated, settled, then rise, be circulated and discharged.

9. Apparatus according to claim 5 wherein the retort has a conical roof which directs the gases from the soil to a pipe which transfers the gases to the combustion chamber for combustion with air and gaseous fuel and to a secondary burner for preheating the soil.

10. Apparatus according to claim 6 further comprising a gas exhaust stack including a gas scrubber for suitable pollution control, wherein the hot exhaust gases from the combustion chamber are transferred to the heating chamber to heat the retort and then to the gas exhaust stack and gas scrubber prior to emission to the environment.

11. Apparatus according to claim 5 wherein the retort has a dome roof which directs the gases from the soil out of the retort.

12. Apparatus for the treatment of toxic waste contaminated soil, the apparatus comprising:

a heated retort;

means for feeding the contaminated soil to the retort comprising a hollow shaft of a rotatable helical spiral through which the soil is fed to the retort, the helical spiral being rotated to agitate the soil in the retort;

agitator means located in the retort for agitating the soil and causing the soil to come into contact with the heated walls of the retort to cause the contaminants in the soil to be given off as gases, the agitator means comprising the rotatable helical spiral;

discharge means from the retort for the treated soil;

a combustion chamber connected to the retort for heating the retort;

heat transfer means for transferring heat from the combustion chamber to at least a portion of the retort to heat the retort; and wherein the discharge means comprises a weir located in the retort over which the treated soil passes and a discharge pipe connected to the retort for receiving soil which has passed by the weir.

* * * * *

UNITED STATES PATENT AND TRADEMARK OFFICE
CERTIFICATE OF CORRECTION

Page 1 of 2

PATENT NO. : 5,655,465
DATED : August 12, 1997
INVENTOR(S) : Sturan G. Robertson It is certified that error appears in the above-identified patent and that said Letters Patent is hereby corrected as shown below:

Column 1, line 6, kindly delete "particular by" and insert

---- particularly ----.

Column 1, line 28, between "PCB's" and "the", kindly delete the extra space.

Column 1, line 58, kindly delete "cheer" and insert ---- chamber ----.

Column 1, line 62, kindly delete "Conveyor" and insert

---- conveyor ----.

Column 2, line 8, kindly delete "Soil" and insert ---- soil ----.

Column 2, line 34 after "break" kindly insert a comma ---- , ----.

Column 3, line 17, kindly delete "he" and insert ---- the ----.

Column 3, line 29, kindly delete "he" and insert ---- the ----.

Column 4, line 5, kindly delete "pro-heated" and insert

---- pre-heated ----.

UNITED STATES PATENT AND TRADEMARK OFFICE
CERTIFICATE OF CORRECTION

PATENT NO. : 5,655,465
DATED : August 12, 1997
INVENTOR(S) : Sturan G. Robertson It is certified that error appears in the above-identified patent and that said Letters Patent is hereby corrected as shown below:

Column 4, line 22, after "111A", kindly delete the comma " ,"and insert a semi-colon ---- ; ----.

Column 4, line 25, after "and", third occurrence, kindly delete the comma " , " same line, after "124", kindly insert a comma ---- , ----.

Signed and Sealed this

First Day of December, 1998

Attest:

BRUCE LEHMAN

*Attesting Officer*   *Commissioner of Patents and Trademarks*